US012139375B2

(12) United States Patent
Matsushita et al.

(10) Patent No.: US 12,139,375 B2
(45) Date of Patent: Nov. 12, 2024

(54) CRANE AND MONITORING DEVICE FOR CRANE

(71) Applicant: SUMITOMO HEAVY INDUSTRIES CONSTRUCTION CRANES CO., LTD., Tokyo (JP)

(72) Inventors: Tatsuya Matsushita, Aichi (JP); Kohei Honjo, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 739 days.

(21) Appl. No.: 17/213,695

(22) Filed: Mar. 26, 2021

(65) Prior Publication Data

US 2021/0300731 A1 Sep. 30, 2021

(30) Foreign Application Priority Data

Mar. 27, 2020 (JP) ................................ 2020-057228

(51) Int. Cl.

*B66C 13/00* (2006.01)
*B66C 9/00* (2006.01)
*B66C 23/72* (2006.01)
*B66C 23/88* (2006.01)

(52) U.S. Cl.

CPC ................ *B66C 13/00* (2013.01); *B66C 9/00* (2013.01); *B66C 23/72* (2013.01); *B66C 23/88* (2013.01); *B66C 2700/0371* (2013.01)

(58) Field of Classification Search

CPC ........... B66C 13/00; B66C 9/00; B66C 23/72; B66C 23/88; B66C 2700/0371; B66C 13/46; B66C 23/16; B66C 13/16; B66C 23/74; B66C 23/86; B66C 23/905

USPC ........................................................ 701/34.2

See application file for complete search history.

(56) References Cited

U.S. PATENT DOCUMENTS

2019/0039863 A1 2/2019 Bohnacker

FOREIGN PATENT DOCUMENTS

| | | | |
|---|---|---|---|
| CN | 104709828 | A | 6/2015 |
| CN | 106586853 | * | 1/2017 |
| DE | 202008008174 | U1 | 11/2009 |
| JP | H01-98595 | A | 4/1989 |
| JP | 2010-241548 | A | 10/2010 |
| JP | 2018-016442 | A | 2/2018 |
| JP | 2018-127357 | * | 10/2018 |

OTHER PUBLICATIONS

Notice of Reasons for Refusal issued in Japanese Application No. 2020-057228 dated Dec. 12, 2023.

Office Action issued in Chinese Application No. 202110326076.3 dated Oct. 25, 2023.

Office Action issued in German Application No. 10 2021 107 703.6 dated May 12, 2023.

* cited by examiner

*Primary Examiner* — Muhammad Shafi

(74) *Attorney, Agent, or Firm* — Michael Best & Friedrich LLP

(57) ABSTRACT

There is provided a crane that is assemblable and disassemblable and is capable of changing a monitoring range for periphery monitoring according to an assembly state of the crane.

13 Claims, 13 Drawing Sheets

CRANE AND MONITORING DEVICE FOR CRANE

RELATED APPLICATIONS

The content of Japanese Patent Application No. 2020-057228, on the basis of which priority benefits are claimed in an accompanying application data sheet, is in its entirety incorporated herein by reference.

BACKGROUND

Technical Field

Certain embodiments of the present invention relate to a crane and a monitoring device for a crane that perform periphery monitoring.

Description of Related Art

A crane in the related art captures an image around a suspended load, displays a bird's-eye view image based on the image on a monitor of a cab of the crane, detects workers around the suspended load, and displays an image of workers helmets in the bird's-eye view image.

Further, in a case where a worker is detected in a dangerous region around the suspended load, the color of the image of the helmet is displayed in black to warn a driver.

SUMMARY

Since there is a case where a form of a crane is changed due to an assembly or disassembly of parts, a monitoring region is changed. However, since a monitoring region is fixed to a predetermined range in the related art, it has not been possible to cope with the change of the monitoring region and it has been difficult to make a more appropriate determination in a case where the form of the crane is changed during assembly or disassembly.

It is desirable to perform periphery monitoring in an appropriate monitoring region in response to the change of the form of a crane.

According to an embodiment of the invention, there is provided a crane that is assemblable and disassemblable and is capable of changing a monitoring range for periphery monitoring according to an assembly state of the crane.

Further, according to another embodiment of the invention, there is provided a monitoring device for a crane that is capable of changing a monitoring range for periphery monitoring according to an assembly state of an assemblable and disassemblable crane.

According to the invention, it is possible to perform periphery monitoring in an appropriate monitoring region in response to the change of the form of a crane caused by the assembly or disassembly of the crane.

DETAILED DESCRIPTION

[Schematic Configuration of Crane]

Figure 1:
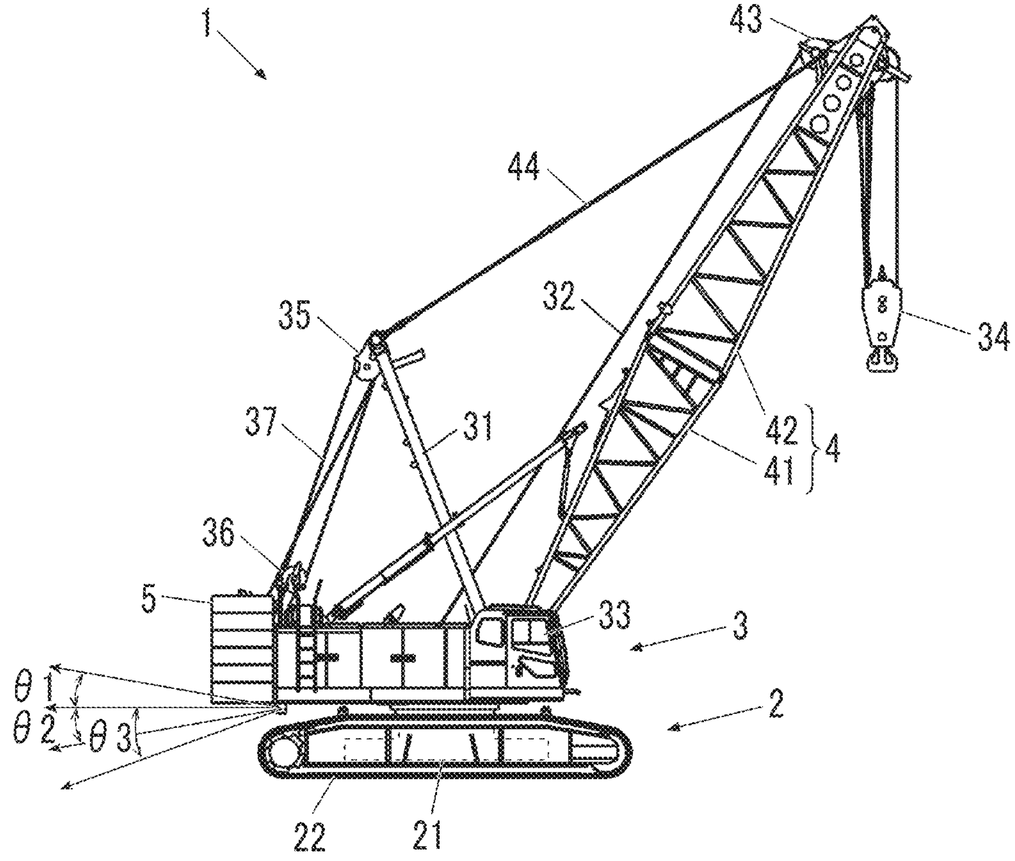
FIG. 1 is a side view of a crane according to an embodiment of the invention.

FIG. 1 is a side view of a crane 1. The crane 1 is a so-called mobile crawler crane. With regard to the description of the crane 1, a front-rear direction and a left-right direction seen from an occupant of a rotating platform 3 will be described as a front-rear direction and a left-right direction of the crane 1. In principle, the front, rear, left, and right of a lower traveling body 2 will be described in a state where the front-rear direction of the lower traveling body 2 coincides with the front-rear direction of the rotating platform 3 (referred to as a reference posture).

As shown in FIG. 1, the crane 1 includes the self-propelled crawler type lower traveling body 2, the rotating platform 3 that is turnably mounted on the lower traveling body 2, and a boom 4 that is attached to a front side of the rotating platform 3 so as to be capable of performing a derricking motion.

The lower traveling body 2 includes a main body 21 and crawlers 22 that are provided on both left and right sides of the main body 21. The left and right crawlers 22 are rotationally driven by traveling hydraulic motors (not shown), respectively.

A lower end portion of the boom 4 is supported on a front side of the rotating platform 3. Further, the lower end portion of a mast 31 is supported on a rear side of a position on the rotating platform 3 where the boom is supported.

Furthermore, the rotating platform 3 is driven to turn about an axis parallel to a vertical direction with respect to the lower traveling body 2 by a turning hydraulic motor (not shown).

A counterweight 5, which is balanced with the weight of the boom 4 and a suspended load, is attached to a rear portion of the rotating platform 3. The counterweight 5 can be increased and decreased in number as necessary.

A derricking winch (not shown), which performs a derricking operation of the boom 4, is provided on the front side of the counterweight 5, and a hoisting winch (not shown), which winds and unwinds a hoisting rope 32, is provided on the front side of the derricking winch. The hoisting winch winds and unwinds the hoisting rope 32 via a hoisting hydraulic motor (not shown) to raise and lower a hook 34 and a suspended load. Further, a cab 33 is disposed on a right front side of the rotating platform 3.

The boom 4 is attached to the rotating platform 3 so as to be capable of performing a derricking motion. The boom 4 includes a lower boom 41 and an upper boom 42.

A sheave 43, which guides the hoisting rope 32, is rotatably attached to an upper end portion of the upper boom 42.

The mast 31 includes an upper spreader 35 at the upper end portion thereof, and the upper spreader 35 is connected to one end portion of a pendant rope 44 of which the other end portion is connected to the upper end portion of the boom 4. A lower spreader 36 is provided below the upper spreader 35. In a case where a derricking rope 37 wound several times between the upper and lower spreaders 35 and 36 is wound or unwound by the derricking winch, a distance between the upper and lower spreaders 35 and 36 is changed, so that the derricking motion of the boom 4 is performed. The derricking winch is driven by a derricking hydraulic motor (not shown).

The crane 1 having the above-mentioned configuration is adapted to be capable of being assembled and disassembled for the purpose of facilitating transportation and the like. "Capable of being assembled and disassembled" mentioned here means that components can be at least reversibly attached and detached.

Figure 2:
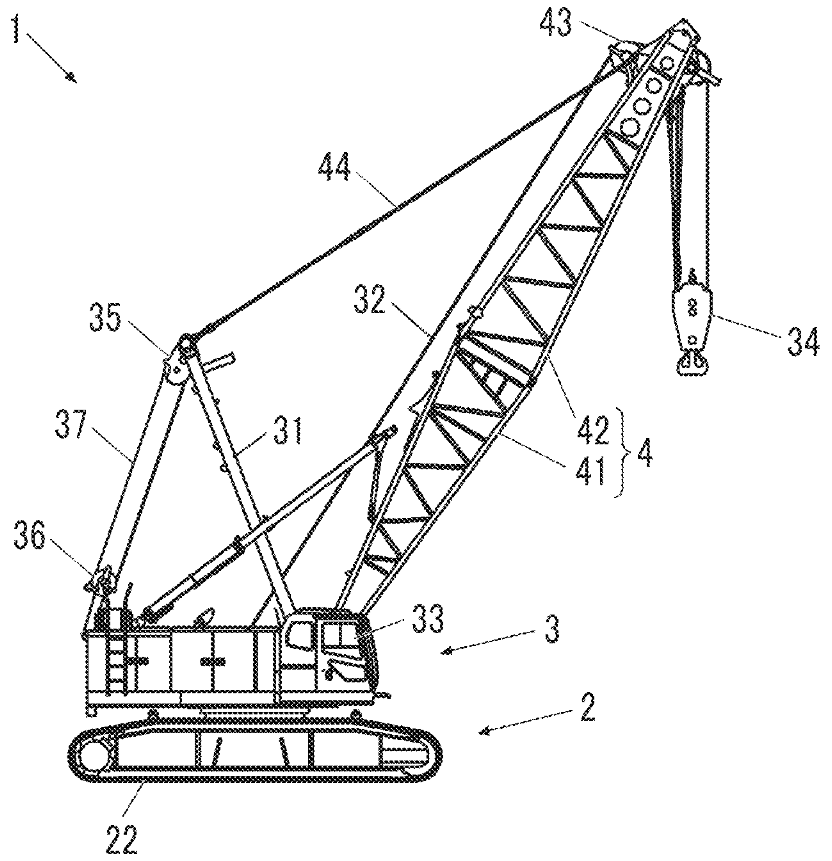
FIG. 2 is a side view of the crane from which a counterweight is removed.

For example, the above-mentioned counterweight 5 can be attached to and detached from a rear end portion of the rotating platform 3, and can also be removed as shown in FIG. 2. The crane 1 may reach a state shown in FIG. 2 during assembly or disassembly, or may perform work for transporting a suspended load in the state shown in FIG. 2.

The counterweight 5 can be attached and detached using the lower boom 41.

Figure 3:
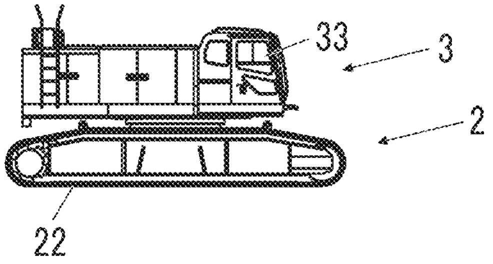
FIG. 3 is a side view of the crane from which a boom is removed.

Further, the above-mentioned boom 4 can be attached to and detached from the rotating platform 3, and can also be removed as shown in FIG. 3. The crane 1 reaches a state shown in FIG. 3 during assembly or disassembly.

Figure 9:
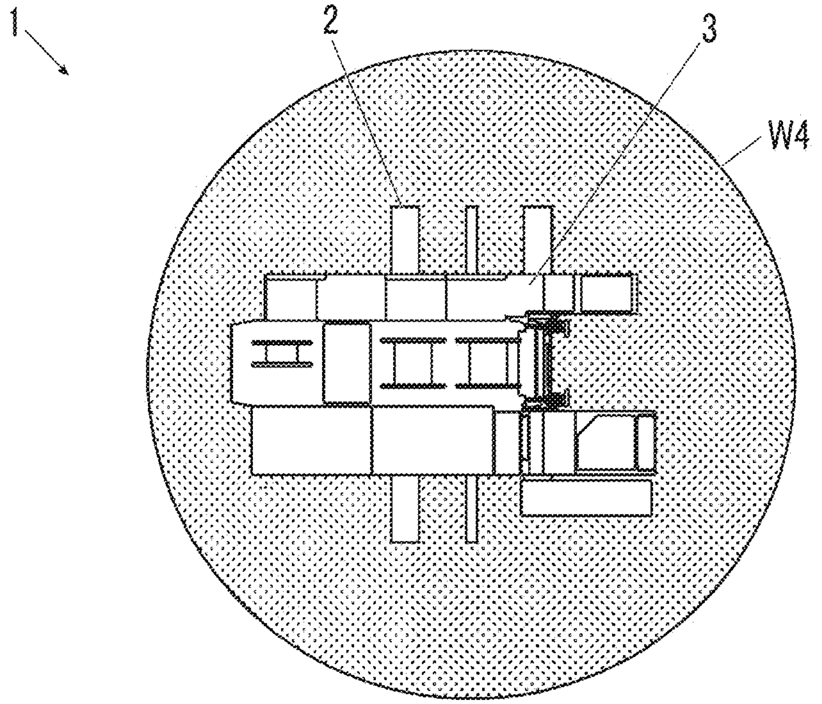
FIG. 9 is a plan view showing a changed monitoring range for the periphery monitoring of the crane.

Furthermore, the above-mentioned crawlers 22 can be attached to and detached from the lower traveling body 2 (see FIG. 9). The crane 1 reaches a state shown in FIG. 9 during assembly or disassembly.

In a case where the boom 4 is not removed from the rotating platform 3, the left and right crawlers 22 can be attached and detached using the lower boom 41.

[Control System of Crane]

Figure 4:
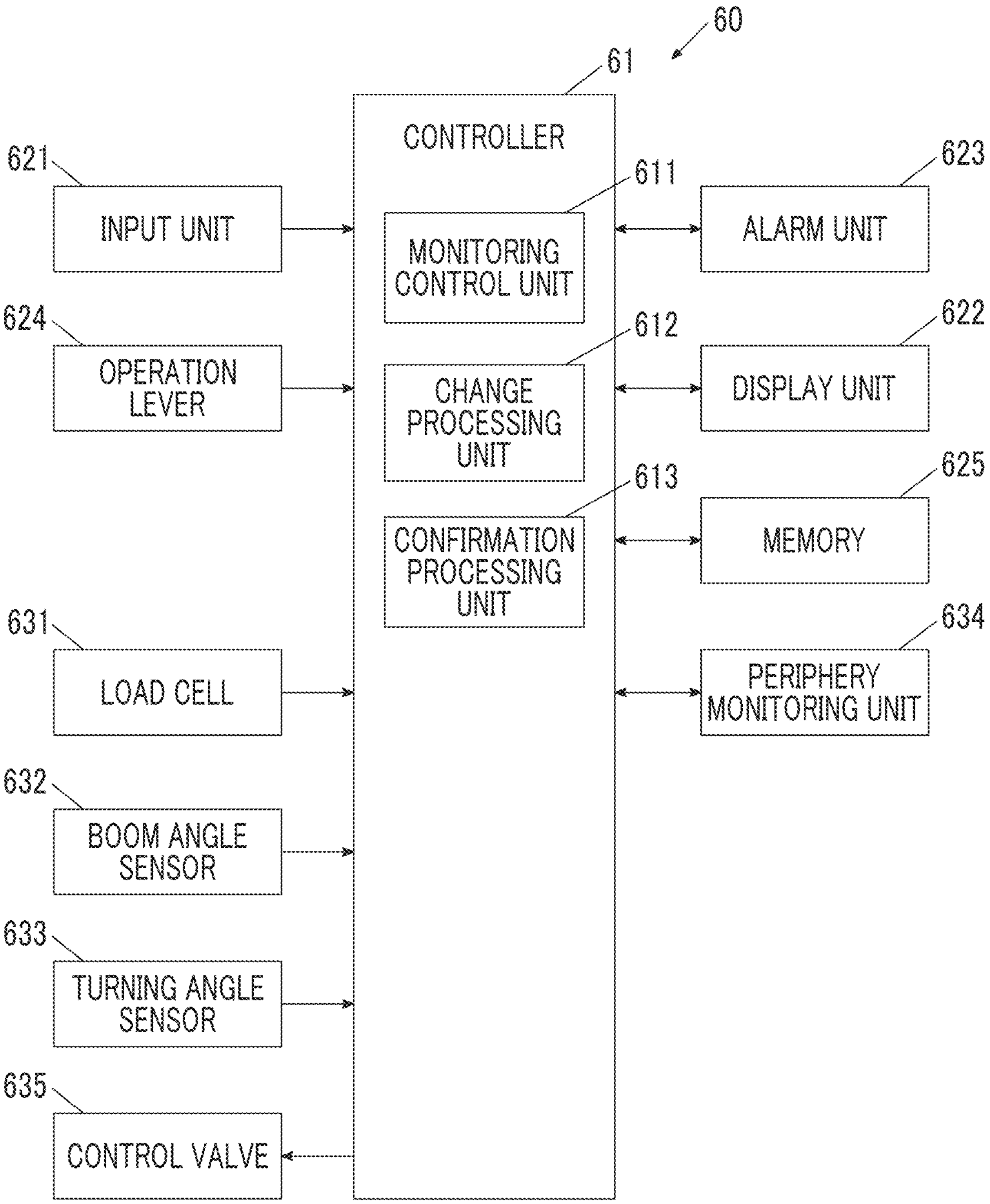
FIG. 4 is a block diagram showing a control device for the crane and a peripheral configuration thereof.

A control device 60 for the crane is provided in the cab 33 of the rotating platform 3. FIG. 4 is a block diagram showing the control device 60 for the crane and the peripheral configuration thereof. The control device 60 is a control terminal mounted on the crane 1, and mainly controls various operations, such as traveling, turning, and suspending of a load of the crane 1.

The control device 60 includes a controller 61 that includes a CPU, a ROM and a RAM serving as storage devices, and a calculation processing device including other peripheral circuits and the like.

The controller 61 includes software modules of a monitoring control unit 611, a change processing unit 612, and a confirmation processing unit 613. The monitoring control unit 611, the change processing unit 612, and the confirmation processing unit 613 may be composed of hardware.

An input unit 621, a display unit 622, an alarm unit 623, an operation lever 624, and a memory 625 are connected to the controller 61, and these form the control device 60.

In addition, a load cell 631, a boom angle sensor 632, a turning angle sensor 633, periphery monitoring units 634, and a control valve 635 are connected to the controller 61.

The input unit 621 is, for example, a touch panel and outputs a control signal, which corresponds to an operation input from a worker, to the controller 61. A worker can operate the input unit 621 to set the length of the boom 4 and the weight of a suspended load and to perform various other settings.

The display unit 622 is, for example, a touch panel type display also used as the input unit 621, and displays information, such as the weight of a suspended load, a boom angle, and a turning angle of the rotating platform 3, on a display screen on the basis of a control signal output from the controller 61.

The alarm unit 623 generates an alarm on the basis of a control signal output from the controller 61.

The operation lever 624 is, for example, used to manually input operations for causing the crane 1 to perform various operations and to input a control signal corresponding to a manipulated variable of the operation lever 624 to the controller 61.

For example, the operation lever 624 can be used to input a traveling operation of the lower traveling body 2, a turning operation of the rotating platform 3, a derricking operation of the boom 4, and a raising/lowering operation of a suspended load.

The load cell 631 is attached to the upper spreader 35, measures tension acting on the pendant rope 44 causing the boom 4 to perform a derricking motion, and outputs a control signal corresponding to the measured tension to the controller 61.

The boom angle sensor 632 is attached to a base end side of the boom 4, measures a derricking angle of the boom 4 (hereinafter, also referred to as a boom angle), and outputs a control signal corresponding to the measured boom angle to the controller 61. The boom angle sensor 632 measures, for example, a ground angle, which is an angle with respect to the horizontal plane, as the boom angle.

The turning angle sensor 633 is attached between the lower traveling body 2 and the rotating platform 3, measures the turning angle of the rotating platform 3, and outputs a control signal corresponding to the measured turning angle to the controller 61. The turning angle sensor 633 measures, for example, an angle around a vertical axis as the turning angle.

The control valve 635 is formed of a plurality of valves that can be switched according to a control signal output from the controller 61.

For example, the control valve 635 includes: a valve that switches the supply and cut-off of hydraulic pressure to the traveling hydraulic motors, which rotationally drive the left and right crawlers 22 of the lower traveling body 2, from a hydraulic pump included in the crane 1 and switches rotation directions; a valve that switches the supply and cut-off of hydraulic pressure to the turning hydraulic motor, which performs the turning operation of the rotating platform 3, from the hydraulic pump and switches a rotation direction; a valve that switches the supply and cut-off of hydraulic pressure to the derricking hydraulic motor, which rotationally drives the derricking winch, from the hydraulic pump and switches a rotation direction; a valve that switches the supply and cut-off of hydraulic pressure to the hoisting hydraulic motor, which rotationally drives the hoisting winch, from the hydraulic pump and switches a rotation direction; and the like.

Each periphery monitoring unit 634 is a distance measurement instrument that uses a sensor for measuring a distance to an object present around the crane 1, for example, a laser scanner, such as LIDER (light detection and ranging).

Figure 5:
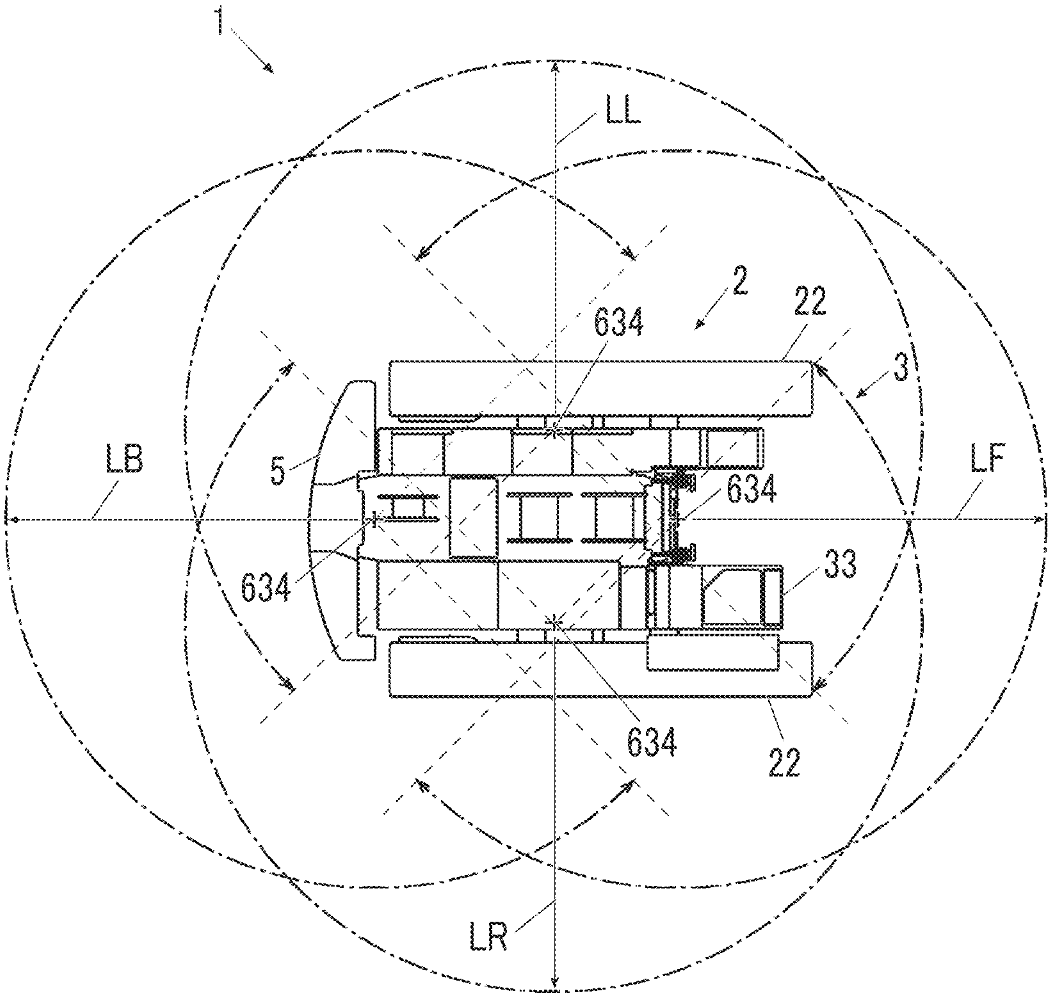
FIG. 5 is a plan view showing detection ranges depending on the installation of periphery monitoring units.

FIG. 5 is a plan view showing detection ranges depending on the installation of the periphery monitoring units 634. FIG. 5 shows a disposition example where the periphery monitoring units 634 are installed at a total of four positions, that is, a bottom surface of a front end portion, a bottom surface of a rear end portion, a bottom surface of a left end portion, and a bottom surface of a right end portion of the rotating platform 3.

As shown in FIG. 5, the periphery monitoring unit 634 installed on the bottom surface of the rear end portion has a fan-shaped two-dimensional horizontal plane, which spreads out in a range of 135° from a straight line LB extending horizontally rearward on each of both left and right sides of the periphery monitoring unit 634 (a range of 2700 in total) in a state where the rotating platform 3 faces straight forward (referred to as the reference posture), as one of measurement planes for a distance. In addition, as shown in FIG. 1, the rear periphery monitoring unit 634 has a total of four two-dimensional planes, that is, the fan-shaped measurement plane and three two-dimensional planes obtained in cases where the fan-shaped measurement plane is inclined on the rear side obliquely upward by an angle θ1 and on the rear side obliquely downward by angles θ2 and θ3 around a horizontal axis extending in the left-right direction and passing through the periphery monitoring unit 634, as the measurement planes (θ1<90°, θ2<90°, θ3<90°, and θ2<θ3).

Further, as shown in FIG. 5, the periphery monitoring unit 634 installed on the bottom surface of the front end portion of the rotating platform 3 has a fan-shaped two-dimensional horizontal plane, which spreads out in a range of 135° from a straight line LF extending horizontally forward on each of both left and right sides of the periphery monitoring unit 634 (a range of 270° in total) in the case of the rotating platform 3 having the reference posture, as one of measurement planes for a distance.

Furthermore, as shown in FIG. 5, each of the periphery monitoring units 634 installed on the bottom surface of the left end portion and the bottom surface of the right end portion of the rotating platform 3 has a fan-shaped two-dimensional horizontal plane, which spreads out in a range of 135° from each of straight lines LL and LR extending horizontally leftward and rightward on each of both front and rear sides of the periphery monitoring unit 634 (a range of 270° in total) in the case of the rotating platform 3 having the reference posture, as one of measurement planes for a distance.

Although not shown, each of the front, left, and right periphery monitoring units 634 also has a total of four two-dimensional planes, that is, the fan-shaped measurement plane and three two-dimensional planes inclined from the fan-shaped measurement plane obliquely upward by an angle of θ1 and obliquely downward by angles of θ2 and θ3 around a horizontal axis extending in the left-right direction or the front-rear direction and passing through each periphery monitoring unit 634, as the measurement planes.

As shown in FIG. 5, the crane 1 can detect obstacles (humans and objects), which are present around the crane 1, as distance data in the range of 360° around a center axis extending in the vertical direction via the periphery monitoring units 634 installed at four positions. Further, since the periphery monitoring units 634 have sufficient resolution with respect to the periphery, the periphery monitoring units 634 can even detect the shape of an object present on the periphery.

Furthermore, the periphery monitoring units 634 installed at four positions can detect an object in a distance range of up to 10 to 20 m (an arrow shown in FIG. 5 by an alternate long and short dash line indicates an angular range of detection in a plan view and does not indicate a detectable distance).

In addition, since each periphery monitoring unit 634 detects an object in four measurement planes having different angles, which include the horizontal plane, as described above, each periphery monitoring unit 634 can three-dimensionally measure a shape.

The number and disposition of the periphery monitoring units 634 are merely exemplary, and can be appropriately changed as long as the periphery monitoring units 634 can monitor a monitoring range of FIG. 6 to be described later (the entire range of 360° around the crane 1).

Further, the rear periphery monitoring unit 634 is attached at a position corresponding to the rearmost end of the bottom surface of the rotating platform 3 in a state where the counterweight 5 is removed, and the measurement plane, which is inclined obliquely upward and rearward from the position by an angle θ1 around the horizontal axis, includes the bottom of the counterweight 5 as a detection range.

For this reason, the rear periphery monitoring unit 634 can detect the presence or absence of the counterweight 5 on the rotating platform 3. That is, the periphery monitoring unit 634 functions as a detection unit that detects the assembly state of the crane on the basis of the presence or absence of the counterweight 5.

Furthermore, the left and right periphery monitoring units 634 include the left and right crawlers 22 as detection ranges.

For this reason, the left and right periphery monitoring units 634 can detect the presence or absence of the left and right crawlers 22 on the lower traveling body 2. That is, the periphery monitoring units 634 also function as detection units that detect the assembly state of the crane on the basis of the presence or absence of the crawlers 22.

[Periphery Monitoring Performed by Crane]

Figure 6:
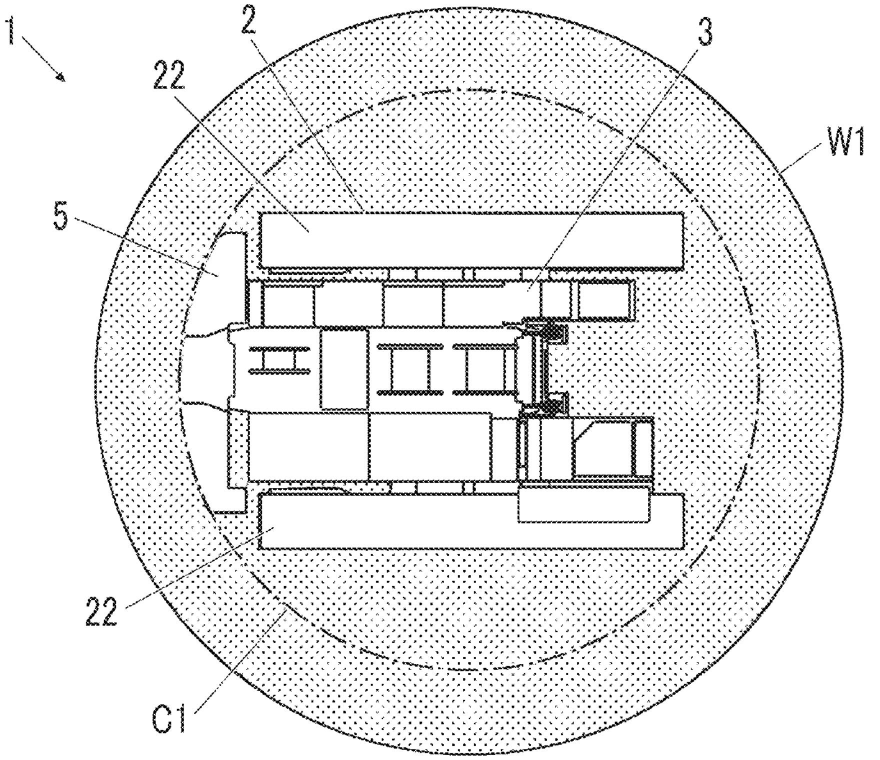
FIG. 6 is a plan view showing a reference monitoring range for the periphery monitoring of the crane.

FIG. 6 is a plan view showing a monitoring range for the periphery monitoring of the crane 1. In principle, as shown in FIG. 6, the crane 1 has a region (hatched region) inside a circle, which is centered on a center of turn of the rotating platform 3, as a monitoring range.

The monitoring range shown in FIG. 6 is a reference monitoring range W1 in a case where work, such as a transportation of a suspended load, is performed in a state where the assembly of the crane 1 is completed (a state shown in FIG. 1).

There are also other monitoring ranges (which will be described later) in addition to the reference monitoring range W1. In a case where the plurality of types of monitoring ranges will be described in the following description without being distinguished from each other, the plurality of types of monitoring ranges will be simply described as "monitoring ranges", and the name of each individual monitoring range will be described in the specific description of each individual monitoring range. The boom 4 is omitted from the crane 1 in the diagrams showing various monitoring ranges, including FIG. 6. However, since the boom 4 is usually in a standing state where the boom 4 faces upward, the boom 4 is excluded from a monitoring range.

Further, data representing the position, shapes, dimensions, and ranges of various monitoring ranges in a plan view are recorded in the memory 625 in advance.

A rear end radius circle C1 based on a radius of the rear end of the rotating platform 3 is shown in FIG. 6 by an alternate long and short dash line. Since the radius of the rear end is equal to a distance between the center of turn of the rotating platform 3 and the outermost portion, that is, a portion corresponding to the rearmost end of the counterweight 5 in a plan view, the rotating platform 3 is in a range within the rear end radius circle C1 even in a case where the rotating platform 3 turns in any direction (excluding the boom 4). That is, as long as obstacles, such as humans and objects, are present outside this range, contact or collision between the rotating platform 3 and the obstacles, such as humans and objects, can be avoided during the turn of the rotating platform 3.

The reference monitoring range is the inside of a circle of which the radius is equal to the sum of the radius of the rear end radius circle C1 and an extra length for ensuring sufficient safety, and the crane 1 monitors a presence of obstacles in this reference monitoring range. The detection ranges of the above-mentioned periphery monitoring units 634 include all monitoring ranges including other monitoring ranges to be described later.

Since reflected light is generated due to laser scanning in a case where an obstacle is present in the detection ranges of the periphery monitoring units 634, the periphery monitoring units 634 detect the reflected light to measure distances. Since the periphery monitoring units 634 detect the periphery thereof with high resolution, the periphery monitoring units 634 can even measure a cross-sectional shape in a plan view from distances corresponding to respective positions on a surface of an obstacle. In a case where an obstacle is detected on the basis of the periphery monitoring units 634, the monitoring control unit 611 of the controller 61 of the crane 1 determines whether or not the obstacle has entered the reference monitoring range. In a case where the obstacle has entered the reference monitoring range, the monitoring control unit 611 performs corresponding processing for entry.

The corresponding processing performed by the monitoring control unit 611 includes recording processing.

In a case where the entry of the obstacle into a monitoring range is confirmed, the position, entry time, and the like of the obstacle are recorded in the memory 625 in the recording processing. Further, the monitoring control unit 611 may identify whether the obstacle is a human or an object from the shape of the obstacle that is obtained from the detection of the periphery monitoring units 634, and may record results thereof.

The corresponding processing performed by the monitoring control unit 611 includes notification processing.

In a case where the entry of the obstacle into a monitoring range is confirmed, the display unit 622 or the alarm unit 623 warns an operator of the confirmation of entry in the notification processing.

In a case where the position of the obstacle having entered and the obstacle are identified, the display unit 622 may also display identification results and the like.

Further, the alarm unit 623 may generate an alarm sound at the time of the notification processing, and may change the volume or tone of the alarm sound, a tempo, and the like as the position of the obstacle having entered becomes close. Furthermore, in a case where the obstacle having entered is identified, the alarm unit 623 may change the tone of the alarm sound depending on the type of the identified obstacle.

The corresponding processing performed by the monitoring control unit 611 includes emergency stop processing.

In a case where the entry of the obstacle into a monitoring range is confirmed, control for stopping the traveling operation of the lower traveling body 2, the turning operation of the rotating platform 3, the derricking operation of the boom 4, the raising/lowering operation of a suspended load, or the like is performed in the emergency stop processing. In order to avoid sudden stop, the operation may be stopped while the speed of the operation is reduced in stages or gradually. Further, the operation may be controlled to stop while a speed reduction rate is increased as the position of the obstacle having entered becomes close.

The monitoring control unit 611 may be adapted to perform only one of the above-mentioned corresponding processing, and may be adapted to perform a plurality of types of the above-mentioned corresponding processing in parallel. Further, the monitoring control unit 611 may be adapted so that whether or not each of the above-mentioned corresponding processing is performed can be set according to setting input from the input unit 621, and may be adapted to perform only set corresponding processing.

[Change (1) of Monitoring Range]

The controller 61 includes the change processing unit 612 that changes a monitoring range for periphery monitoring according to the assembly state of the crane.

The patterns of the change of a monitoring range performed by the change processing unit 612 will be described below with reference to FIGS. 7 to 12.

Figure 7:
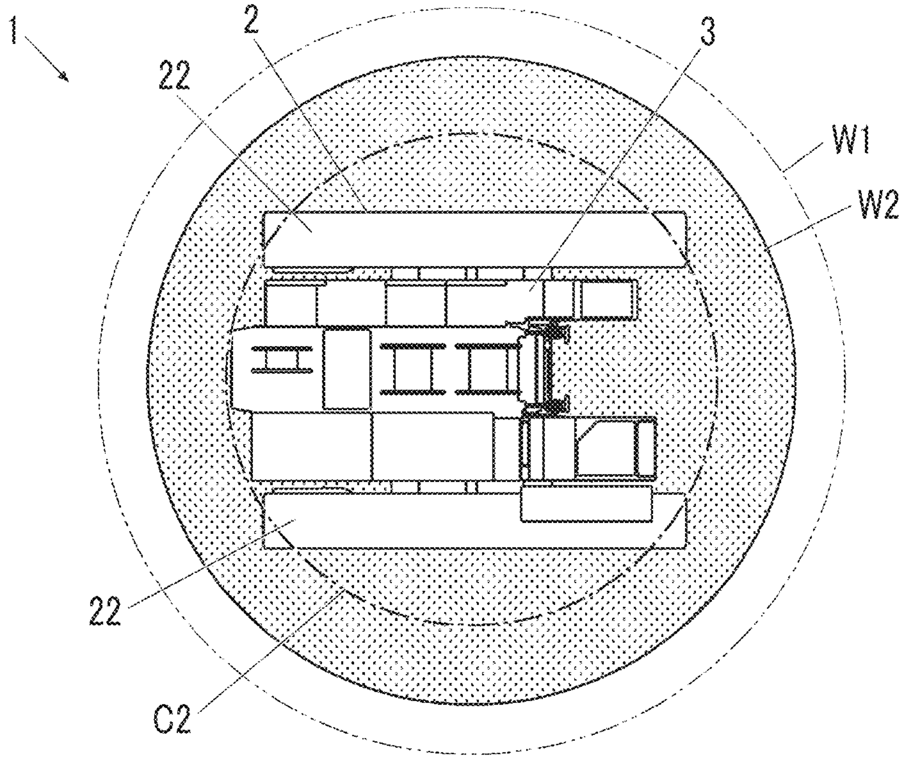
FIG. 7 is a plan view showing a reduced monitoring range for the periphery monitoring of the crane.

FIG. 7 shows a reduced monitoring range W2 in a state where the counterweight 5 is not provided (a state where the counterweight 5 is detached).

The above-mentioned reference monitoring range W1 is the inside of a circle of which the radius is equal to the sum of the radius of the rear end radius circle C1 and an extra length. However, since the radius of the rear end of the rotating platform 3 not provided with the counterweight 5 is reduced, the size of a rear end radius circle C2 is reduced as shown in FIG. 7. Accordingly, the size of the reduced monitoring range W2 is also reduced as compared to that of the reference monitoring range W1.

In a case where it is determined that the rotating platform 3 is provided with the counterweight 5 on the basis of the detection of the periphery monitoring units 634, the change processing unit 612 selects the above-mentioned reference monitoring range W1. In a case where it is determined that the rotating platform 3 is not provided with the counterweight 5, the change processing unit 612 selects the reduced monitoring range W2.

[Change (2) of Monitoring Range]

Figure 8:
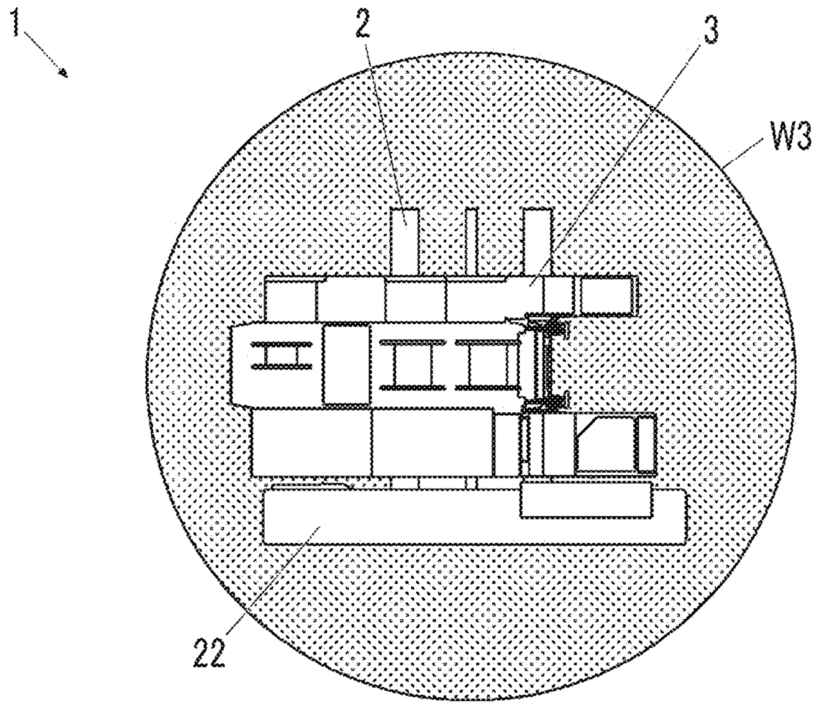
FIG. 8 is a plan view showing a changed monitoring range for the periphery monitoring of the crane.

FIG. 8 shows a form changed from the reduced monitoring range W2 in a case where one crawler 22 is not provided (a case where one crawler 22 is detached) (referred to as a changed monitoring range W3). Further, FIG. 9 shows a form changed from the reduced monitoring range W2 in a case where both the crawlers 22 are not provided (a case where both the crawlers 22 are detached) (referred to as a changed monitoring range W4).

In a case where the crawler 22 is detached from the main body 21, a space corresponding to a position at which the crawler 22 is to be disposed is empty. Accordingly, an obstacle can physically enter this space. For this reason, in a case where one or both of the crawlers 22 are not provided, the space corresponding to a position at which the crawler 22 is to be disposed is also subject to periphery monitoring. Accordingly, as with the changed monitoring ranges W3 and W4, a change to add the space corresponding to a position at which the crawler 22 is to be disposed to a monitoring range can be made.

A case where a change to add the space corresponding to a position at which the crawler 22 is to be disposed is made from the reduced monitoring range W2 is exemplified in FIGS. 8 and 9. However, in a case where the crawler 22 is not provided in a state where the counterweight 5 is mounted on the crane 1, a change to add the space corresponding to a position at which the crawler 22 is to be disposed is made from the reference monitoring range W1.

In a case where it is determined that the lower traveling body 2 is not provided with one or both of the crawlers 22 on the basis of the detection of the periphery monitoring units 634, the change processing unit 612 makes a change to add the space, which corresponds to a position at which the crawler 22 not provided is to be disposed, to a monitoring range from the reference monitoring range W1 or the reduced monitoring range W2 that is currently selected.

[Change (3) of Monitoring Range]

Further, in a case where one or both of the crawlers 22 are not provided (a case where one or both of the crawlers 22 are detached), work for detaching or attaching the crawlers 22 accompanying the turning operation of the rotating platform 3 may be performed using the lower boom 41 mounted on the rotating platform 3 of the crane 1.

In consideration of this, in a case where it is determined that the lower traveling body 2 is not provided with one or both of the crawlers 22 on the basis of the detection of the periphery monitoring units 634, the change processing unit 612 may perform processing for changing a monitoring range according to the turning angle of the rotating platform 3 that is measured by the turning angle sensor 633.

Figure 10:
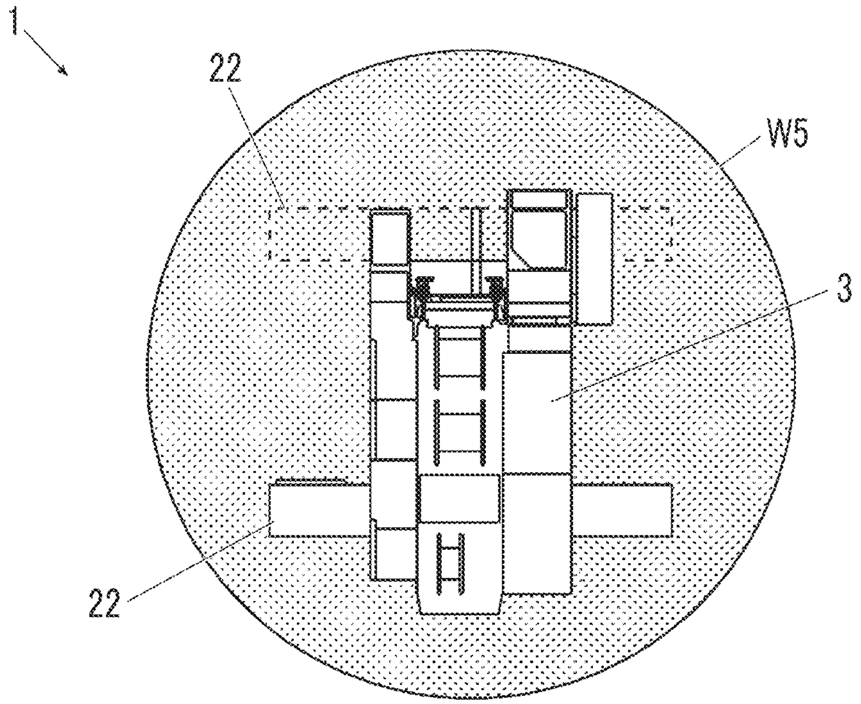
FIG. 10 is a plan view showing a changed form of the changed monitoring range for the periphery monitoring of the crane.
Figure 11:
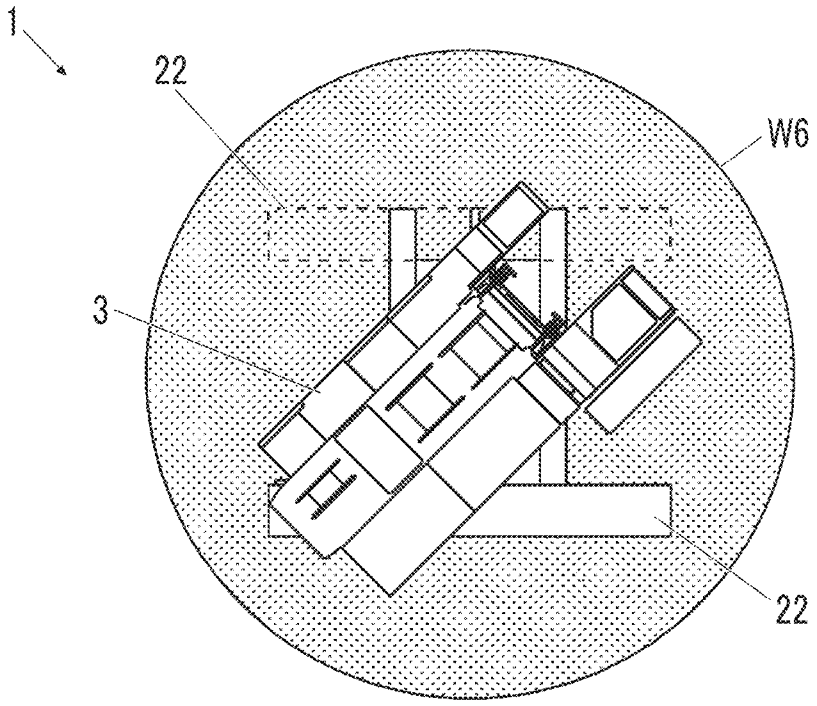
FIG. 11 is a plan view showing a changed form of the changed monitoring range for the periphery monitoring of the crane.
Figure 12:
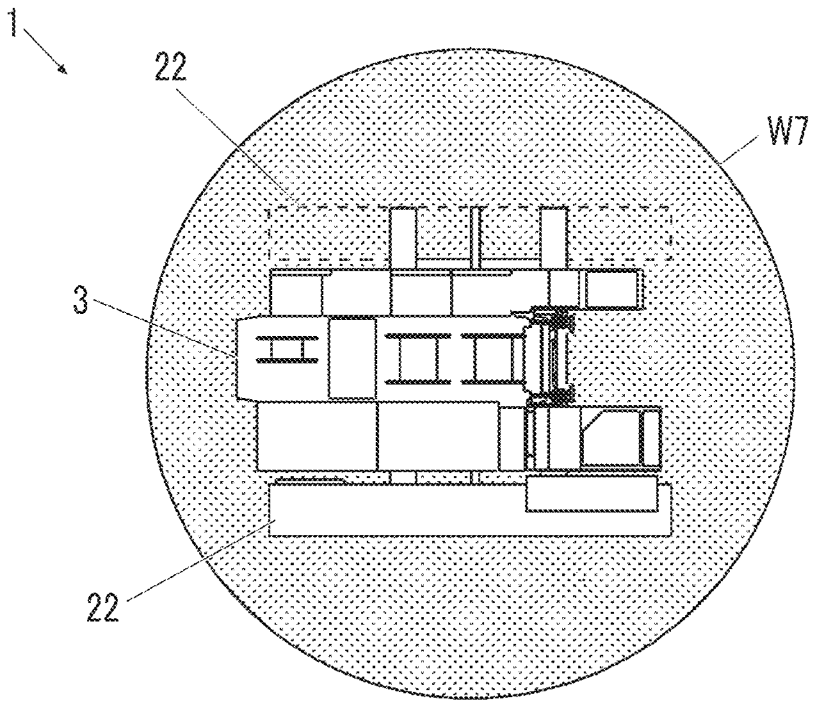
FIG. 12 is a plan view showing a changed form of the changed monitoring range for the periphery monitoring of the crane.

FIG. 10 shows a changed form in a state where the rotating platform 3 turns to the left by an angle of 90° with respect to the changed monitoring range W3 in a case where one crawler 22 is not provided (a case where one crawler 22 is detached) (referred to as a changed monitoring range W5). Further, FIG. 11 shows a changed form in a state where the rotating platform 3 turns to the left by an angle of 45° (referred to as a changed monitoring range W6), and FIG. 12 shows a changed form in a state where the rotating platform 3 returns to a state where the rotating platform 3 faces forward (referred to as a changed monitoring range W7).

The changed monitoring range W5 shown in FIG. 10 is changed so that a range in a plan view in a state where the rotating platform 3 turns to the left by an angle of 90° with respect to the above-mentioned changed monitoring range W3 is excluded from a monitoring range. The changed monitoring range W6 shown in FIG. 11 is changed so that a range in a plan view in a state where the rotating platform 3 turns to the left by an angle of 45° with respect to the above-mentioned changed monitoring range W3 is excluded from a monitoring range. The changed monitoring range W7 shown in FIG. 12 returns to the same state as the above-mentioned changed monitoring range W3.

For example, the change processing unit 612 selects the changed monitoring range W5 in a case where the turning angle of the rotating platform 3 is measured in a range of 90°±22.5° to the left side by the turning angle sensor 633, selects the changed monitoring range W6 in a case where the turning angle of the rotating platform 3 is measured in a range of 45°±22.5° to the left side by the turning angle sensor 633, and selects the changed monitoring range W7 in a case where the turning angle of the rotating platform 3 is measured in a range of 0°±22.5° by the turning angle sensor 633.

The changed monitoring range may be changed in stages as described above. Alternatively, ranges where the rotating platform 3 has turned may be sequentially calculated according to the turning angles of the rotating platform 3 measured by the turning angle sensor 633 to cause the changed monitoring range to be continuously changed.

Here, cases where the rotating platform 3 turns in a range of 0° to 90° are exemplified. However, even in a case where the rotating platform 3 turns in a range of 90° to 360°, a monitoring range is changed to a changed monitoring range corresponding to the turning angle of the rotating platform 3.

Further, the changed monitoring ranges W5 to W7 exemplify a state where one crawler 22 is detached. However, in the case of a state where both the crawlers 22 are detached, a monitoring range is changed to a changed monitoring range corresponding to the turning angle of the rotating platform 3 in a state where positions at which these crawlers 22 are to be disposed are added to the monitoring range. Furthermore, even in a state where both the crawlers 22 are attached, a monitoring range may be changed to a changed monitoring range, which corresponds to the turning angle of the rotating platform 3, from the reference monitoring range W1 or the reduced monitoring range W2.

[Processing for Confirming Change of Monitoring Range]

The controller 61 includes the confirmation processing unit 613 that confirms with a driver in advance whether or not a monitoring range can be changed in a case where a monitoring range is to be changed by the change processing unit 612. The change processing unit 612 can determine whether or not to change a monitoring range according to a result from the confirmation processing unit 613 confirmed by the driver.

Figure 13:
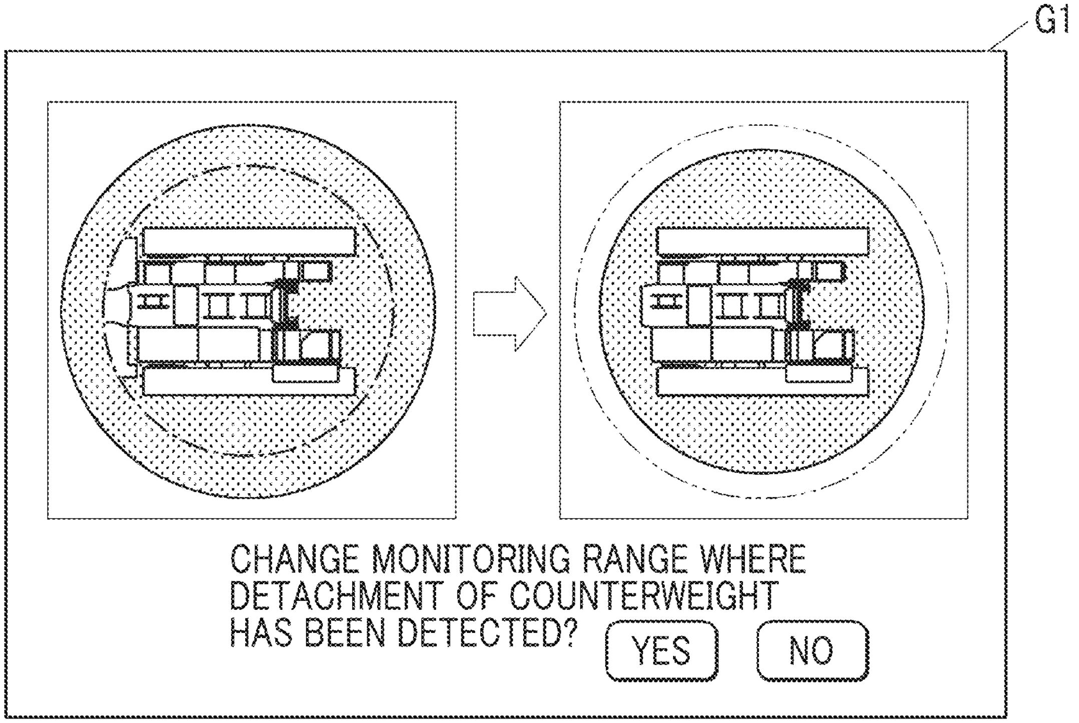
FIG. 13 is a display example of a confirmation screen for permission to change a monitoring range.

In a case where the change processing unit 612 determines that a monitoring range is to be changed, the confirmation processing unit 613 displays a confirmation screen G1 for permission to change a monitoring range on the display unit 622 of the cab 33. FIG. 13 is a display example of the confirmation screen G1.

After, for example, both a monitoring range not yet changed and a changed monitoring range are displayed on the confirmation screen G1, whether or not a monitoring range can be changed is confirmed. In regard to this, a driver inputs or does not input permission or refusal to change a monitoring range through the input unit 621.

In regard to this, the confirmation processing unit 613 notifies the change processing unit 612 of permission to change a monitoring range only in a case where permission to change a monitoring range is input. The change processing unit 612 changes a monitoring range after being notified of permission to change a monitoring range.

Figure 14:
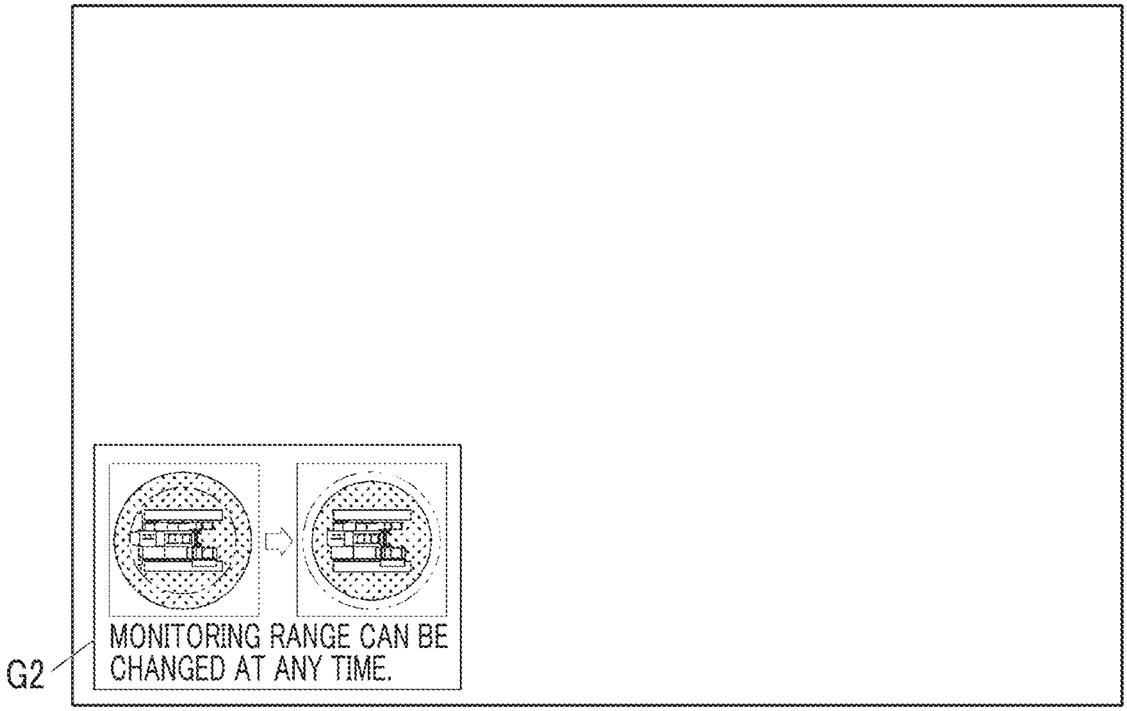
FIG. 14 is a display example of a notification screen that receives an input to change a monitoring range.

Further, in a case where refusal to change a monitoring range is input or both of permission and refusal are not input for a certain time after the confirmation screen G1 is displayed, the confirmation processing unit 613 returns the display unit 622 to a display state at the time of a normal operation and displays a notification screen G2 shown in FIG. 14, which receives an input to change a monitoring range, at the edge of the screen so as not to interfere with the display state. That is, the notification screen G2 is made smaller than the confirmation screen G1 and is moved away from the center of the screen.

In a case where a selection operation is input to the notification screen G2 through the input unit 621, the confirmation processing unit 613 displays the confirmation screen G1 again and confirms whether or not a monitoring range can be changed.

[Flow of Periphery Monitoring Processing Performed by Crane]

Figure 15:
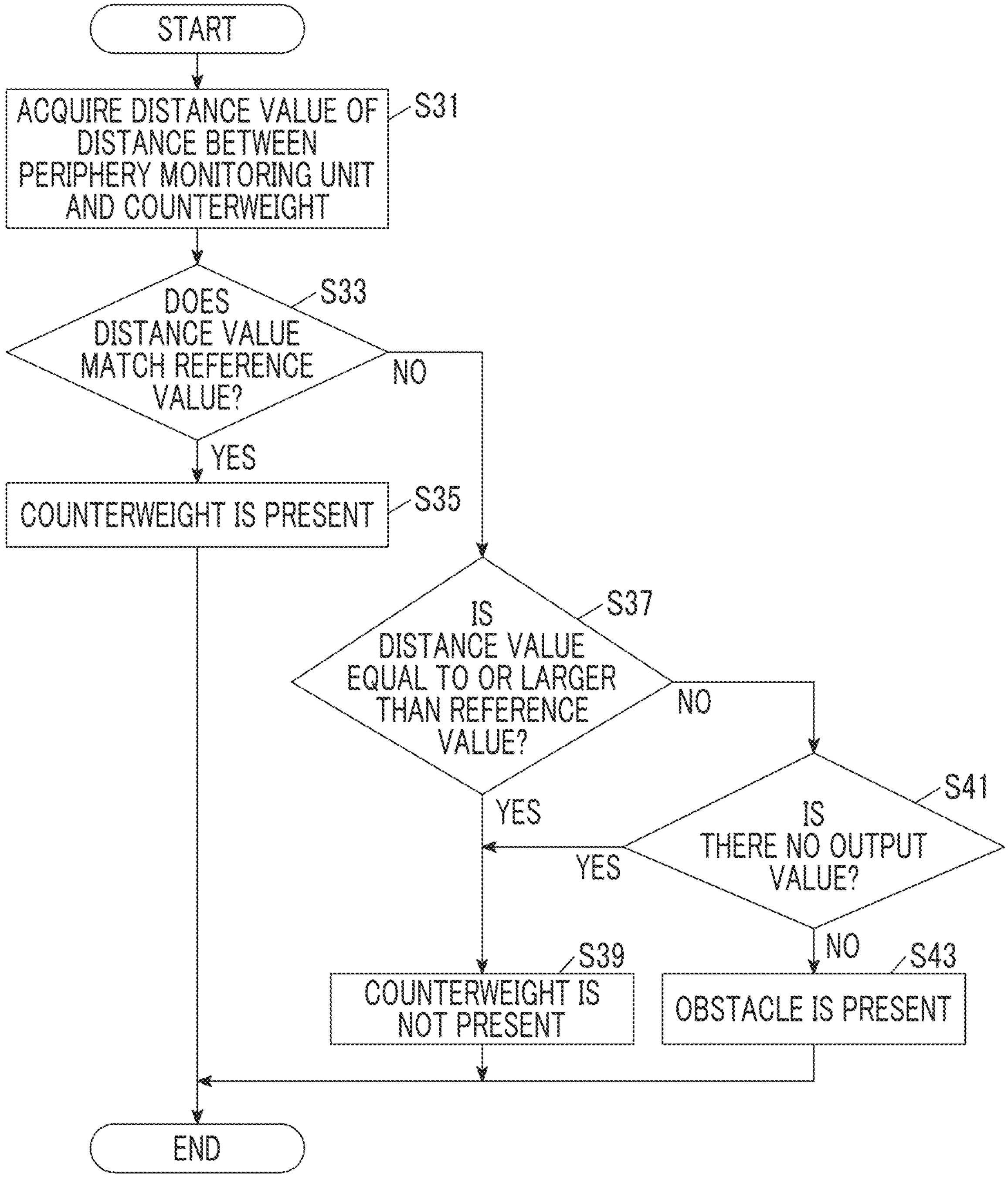
FIG. 15 is a flowchart showing processing for determining the presence or absence of a counterweight in the crane.

FIG. 15 is a flowchart showing processing for determining the presence or absence of the counterweight 5 in the crane 1. The controller 61 periodically detects whether or not the counterweight 5 is attached.

That is, as shown in FIG. 15, the controller 61 acquires distance values for the periphery based on the detection of the periphery monitoring units 634 (Step S31).

The controller 61 refers to the distance value corresponding to a direction where the counterweight 5 should be present among the distance values for the periphery based on the detection of the periphery monitoring units 634, and determines whether or not the measured distance value matches a reference value that is a distance value to be obtained in a case where the counterweight 5 is present (Step S33). The reference value for the counterweight 5 is prepared in the memory 625 in advance.

In a case where the measured distance value matches the reference value, the controller 61 records in the memory 625 that the counter weight 5 is currently attached as counterweight attachment/detachment information (Step S35) and ends the processing.

On the other hand, in a case where the measured distance value does not match the reference value, the controller 61 determines whether or not the measured distance value is larger than the reference value (Step S37).

In a case where the measured distance value is larger than the reference value, this means that the detached counterweight 5 or an object other than the counterweight 5 has been detected. Accordingly, the controller 61 records counterweight attachment/detachment information, which represents that the counterweight 5 is not currently attached to the rotating platform 3, in the memory 625 (Step S39) and ends the processing.

On the other hand, in a case where the measured distance value is not larger than the reference value, the controller 61 determines whether or not the measured distance value itself is obtained (Step S41).

In a case where the measured distance value itself is not obtained, an object is not present in at least ranges where the periphery monitoring units 634 can measure distances. Accordingly, processing proceeds to Step S39 and the controller 61 records counterweight attachment/detachment information, which represents that the counter weight 5 is not currently attached to the rotating platform 3, in the memory 625 and ends the processing. On the other hand, in a case where the measured distance value is obtained, the measured distance value represents a distance less than the reference value which means that an object other than the counterweight 5 is detected. Accordingly, the controller 61 records in the memory 625 that an object (obstacle) other than the counterweight 5 is detected (Step S43) and ends the processing.

Figure 16:
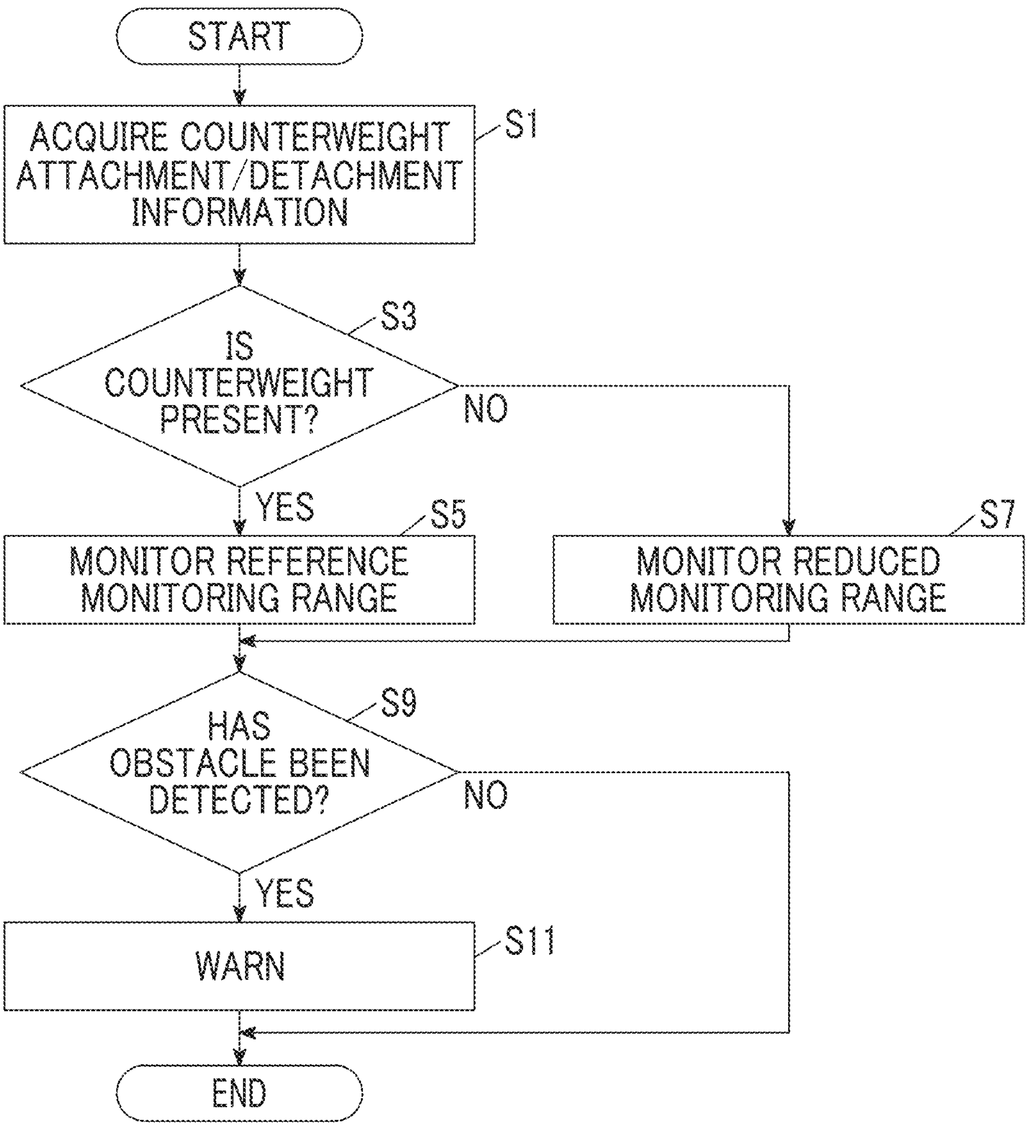
FIG. 16 is a flowchart showing periphery monitoring processing of the crane.

Next, the periphery monitoring of the crane 1 will be described. FIG. 16 is a flowchart showing the periphery monitoring processing of the crane 1 that is performed by the controller 61. This periphery monitoring processing is repeatedly performed in a short cycle during work for assembling or disassembling the crane 1, work for transporting a suspended load, or the like.

First, the controller 61 reads the counterweight attachment/detachment information recorded in the memory 625 (Step S1), and determines whether or not the counterweight 5 is attached to the rotating platform 3 (Step S3).

Then, in a case where the counterweight attachment/detachment information represents that the counterweight 5 is currently attached, the controller 61 selects the above-mentioned reference monitoring range W1 (see FIG. 6) and monitors the entry of an obstacle into the reference monitoring range W1 (Step S5).

At this time, in a case where the confirmation processing unit 613 is set to perform confirmation and a monitoring range is to be changed to the reference monitoring range W1 from another monitoring range, the reference monitoring range W1 is selected only in a case where the confirmation screen G1 is displayed on the display unit 622 and permission to change a monitoring range is input.

Further, in a case where the counterweight attachment/detachment information represents that the counterweight 5 is currently detached, the controller 61 selects the above-mentioned reduced monitoring range W2 (see FIG. 7) and monitors the entry of an obstacle into the reduced monitoring range W2 (Step S7).

At this time, in a case where the confirmation processing unit 613 is set to perform confirmation and a monitoring range is to be changed to the reduced monitoring range W2 from another monitoring range, the reduced monitoring range W2 is selected only in a case where the confirmation screen G1 is displayed on the display unit 622 and permission to change a monitoring range is input.

After that, the controller 61 determines the presence or absence of an obstacle in the monitoring range W1 or W2 selected on the basis of the detection of the periphery monitoring units 634 (Step S9).

Then, in a case where an obstacle is not detected in the monitoring range W1 or W2, the monitoring processing ends.

On the other hand, in a case where an obstacle is detected in the monitoring range W1 or W2, the controller 61 warns an operator of the detection of an obstacle via the display unit 622 or the alarm unit 623 (Step S11) and ends the monitoring processing. In a case where an obstacle is detected, recording processing for recording the detection of the obstacle or emergency stop processing for the operation of the crane 1 can also be performed in addition to the notification processing using a warning or instead of the notification processing.

A case where a monitoring range is changed depending on the presence or absence of the counterweight 5 has been exemplified in the monitoring processing, but a monitoring range may be changed depending on the presence or absence of the crawlers 22.

That is, as in the case of the counterweight 5 shown in FIG. 15, the controller 61 can detect the presence or absence of the crawlers 22 in advance on the basis of the detection of the periphery monitoring units 634 and can record detection results in the memory 625 in advance as attachment/detachment sensor information. In the case of the crawlers 22, the controller 61 needs to detect the presence or absence of each of the left and right crawlers 22.

Then, in the monitoring, during Steps S1 to S7 shown in FIG. 16, the controller 61 determines whether or not to add the spaces, which correspond to positions at which the crawlers 22 are to be disposed, to a monitoring range depending on the presence or absence of the left and right crawlers 22.

Further, in a case where the crawlers 22 are detached and a monitoring range is to be changed according to the turning angle of the rotating platform 3, processing for measuring the turning angle of the rotating platform 3 in an earlier step than Step S9 shown in FIG. 16 and processing for selecting the above-mentioned changed monitoring ranges W5 to W7 according to the measured turning angle are added.

Technical Effects of Embodiment of the Invention

Since the crane 1 can change a monitoring range for periphery monitoring according to the assembly state of the crane 1 as described above, the crane 1 can select an appropriate monitoring range according to the assembly state of the crane 1. Accordingly, the crane 1 can more effectively detect obstacles and the like.

For example, in the case of a crane in the related art, work is complicated since monitoring is insufficient in a case where a monitoring range is narrow with respect to the assembly state of the crane, and monitoring is excessive in a case where a monitoring range is wide with respect to the assembly state of the crane. However, since the crane 1 sets an appropriate monitoring range, the crane 1 can perform sufficient monitoring while reducing an influence on work.

Further, since the crane 1 includes the periphery monitoring units 634 as detection units that detect the assembly state of the crane 1, it is not necessary to use external detectors for the crane 1 (for example, cameras and the like installed at a work site). For this reason, communication equipment and the like for acquiring external detection results are not needed. Furthermore, in a case where external detectors are used, a detection needs to be made in installation ranges of the external detectors. However, the crane 1 is not subject to such restrictions, and the assembly state can be detected wherever the crane 1 is located.

Moreover, since the assembly state of the crane is detected by the periphery monitoring unit 634, dedicated sensors used to detect the counterweight 5 and the crawlers 22 are not needed. Accordingly, the number of parts can be reduced, and even a need for wiring for the sensors and the like can be eliminated.

Further, the controller 61 of the crane 1 includes the confirmation processing unit 613 that confirms with a driver whether or not a monitoring range can be changed, and the change processing unit 612 changes a monitoring range after an input to change a monitoring range is received.

Accordingly, since a driver can determine to change a monitoring range according to actual circumstances, high workability can be maintained.

Furthermore, since the notification screen G2 is continuously displayed on the display unit 622 even though there is no input to change a monitoring range, a monitoring range can be more appropriately changed according to a change of a work situation or the like by the driver's determination.

Moreover, in the crane 1, a monitoring range can be changed to the reduced monitoring range W2 from the reference monitoring range W1 according to a change in the radius of the rear end of the rotating platform 3, which is the assembly state of the crane 1. In particular, a monitoring range can be changed depending on a change in the radius of the rear end that is caused by the attachment/detachment of the counterweight 5.

The crane 1 involves the turning operation of the rotating platform 3 in many cases, such as during assembly and disassembly and during work for transporting a suspended load. However, since a monitoring range is appropriately selected according to a change in the radius of the rear end of the rotating platform 3, appropriate periphery monitoring can be achieved while workability is ensured.

Further, in the crane 1, a monitoring range can be changed according to the state of the presence or absence of the crawler 22 present, which is the assembly state of the crane 1. Furthermore, in a case where the crawler 22 is not attached, change processing for adding a position at which the crawler 22 is to be disposed to a monitoring range is performed.

For this reason, since it is possible to strictly monitor spaces where a human and the like can enter or cannot enter before and after the attachment of the crawler 22 or to cancel the monitoring of the spaces, it is possible to make a monitoring range more appropriate.

Moreover, in a case where the crawler 22 is not attached, the crane 1 performs change processing for changing a monitoring range according to the turning angle of the rotating platform 3.

For this reason, since it is possible to strictly monitor spaces where a human and the like can enter or cannot enter due to the turning of the rotating platform 3 or to cancel the monitoring of the spaces, it is possible to make a monitoring range more appropriate.

[Monitoring Device for Crane]

Figure 18:
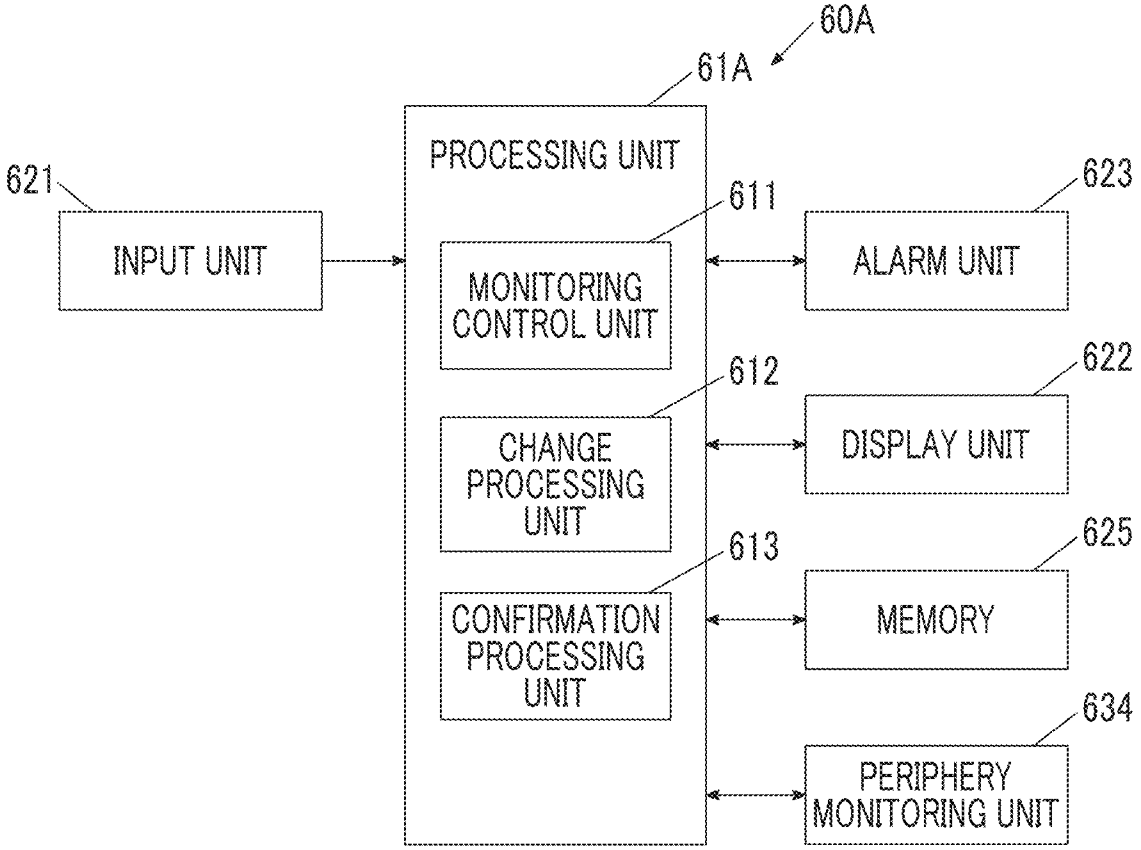
FIG. 18 is a block diagram showing a configuration of a monitoring device for a crane.

A case where the control device 60 of the crane performs periphery monitoring has been exemplified in the crane 1. However, a monitoring device 60A for a crane shown in FIG. 18, which is formed of a device different from the control device 60, may be provided at a rear end of a crane including a control device having no function to perform periphery monitoring, may be provided in the crane, or may be provided near the crane to perform periphery monitoring. The same components of the monitoring device 60A for a crane shown in FIG. 18 as those of the above-mentioned crane 1 will be denoted by the same reference numerals as those of the crane 1, and the repeated description thereof will be omitted.

The monitoring device 60A for a crane includes a processing unit 61A, and an input unit 621, a display unit 622, an alarm unit 623, a memory 625, and periphery monitoring units 634 are connected to the processing unit 61A. The periphery monitoring units 634 may acquire detection information via wired communication or wireless communication.

Further, the processing unit 61A includes software modules of a monitoring control unit 611, a change processing unit 612, and a confirmation processing unit 613. The monitoring control unit 611, the change processing unit 612, and the confirmation processing unit 613 may be composed of hardware.

As with the above-mentioned crane 1, appropriate periphery monitoring for a crane having no periphery monitoring function can be performed by this monitoring device 60A.

[Other]

Details described in the embodiments of the invention can be appropriately changed without departing from the scope of the invention.

For example, a case where the above-mentioned reference monitoring range W1 is set to a circular range surrounding the entire periphery of the crane 1 has been exemplified, but the invention is not limited thereto.

For example, in a case where work for transporting a suspended load is performed, the suspended load, a hook, and the like may approach the front portion of the crane 1.

For this reason, since the suspended load, the hook, and the like enter the front portion of the reference monitoring range W1, there is a concern that it may be determined that obstacles are present. On the other hand, the front portion of the reference monitoring range W1 is a range that is easily visible to a driver of a cab 33, and the driver is gazing ahead while working.

Figure 17:
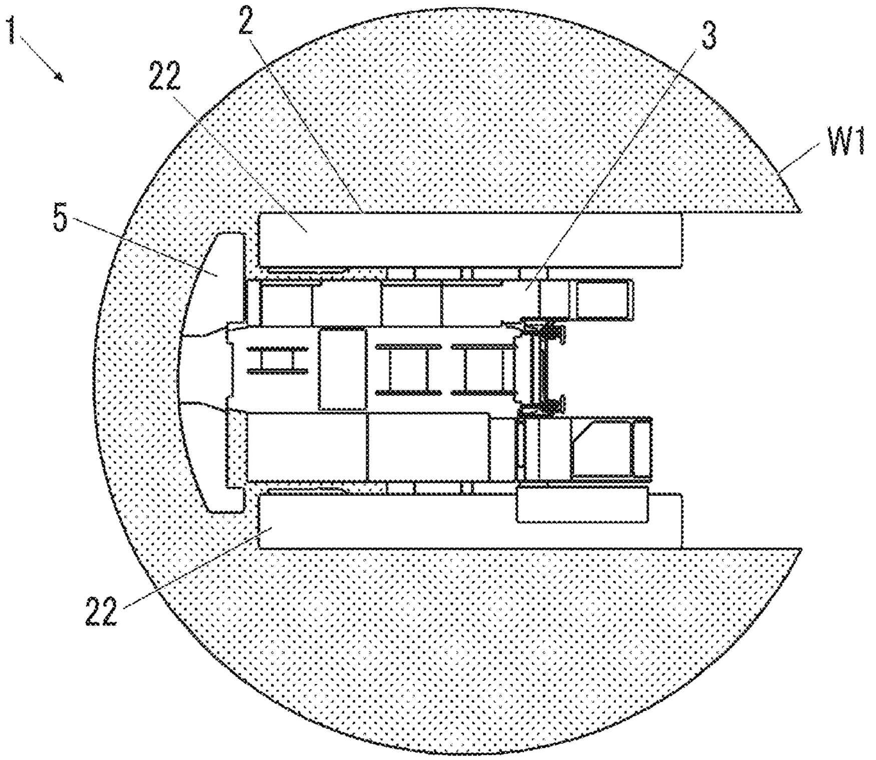
FIG. 17 is a plan view showing a modification example of the reference monitoring range for the crane.

For this reason, a portion of the reference monitoring range W1 on the front side of the rotating platform 3 may be removed from a monitoring range as shown in FIG. 17. Accordingly, during work for transporting a suspended load or the like of the crane 1, good periphery monitoring can be performed while an influence on work is reduced.

Further, a portion of the reference monitoring range W1 on the front side of the rotating platform 3 may be removed from a monitoring range as shown in FIG. 17 not only when the crane 1 is used for transporting a suspended load, but also when the crane 1 is used for assembling and disassembling work, for example, in a case where the counterweight 5, the crawler 22, a lower weight, other attachable and detachable components, and the like are moved by the boom 4 of the crane.

That is, in a case where the crane 1 suspends an object, a monitoring range may be reduced in size regardless of the type of the object so that a portion of the monitoring range on the front side of the rotating platform 3 is reduced in size or is removed.

Further, since workers usually enter a region around the crane during work for attaching or detaching the counterweight 5 or the crawler 22, a region around a position at which the counterweight 5 or the crawler 22 is to be attached may be removed from a monitoring region during these types of work.

Further, a configuration for changing a monitoring range of the crane 1 can be applied to not only a crawler crane but also to other mobile cranes, such as a wheel crane and a truck crane.

Furthermore, a laser scanner has been exemplified as the periphery monitoring unit, but the laser scanner is not limited to one having a two-dimensional detection range, and a laser scanner having a three-dimensional detection range may also be used.

Moreover, not only a laser scanner but also a distance detector using a camera, ultrasound, or the like can be used. Further, a case where the periphery monitoring units 634 are mounted on the crane 1 has been exemplified, but the crane 1 may be adapted to acquire detection information through communication from periphery monitoring units, such as external monitoring cameras installed at the site. In this case, the presence or absence of the counterweight 5 and the crawlers 22 may also be detected by the external periphery monitoring units.

Furthermore, the invention is not limited to a configuration in which the presence or absence of the counterweight 5 and the crawlers 22 is detected by the periphery monitoring units 634, and detectors that can detect the presence or absence of an object, such as sensors or limit switches optically or magnetically detecting an object, may be used.

In addition, instead of a configuration in which the presence or absence of the counterweight 5, the crawler 22, the boom 4, the lower weight, and other attachable and detachable components is detected by the periphery monitoring units or other detection units, a configuration may be employed in which a human inputs whether or not the attachable and detachable components are present from the input unit 621 or the like, and a monitoring range is changed according to the input.

Further, a case where the counterweight 5, the crawlers 22, the boom 4, and the like are attachable and detachable (assemblable and disassemblable) has been exemplified in the crane 1, but the lower weight may be attachable and detachable as well. In this case, after the lower weight is detached, a space corresponding to a portion at which the lower weight is to be attached is added to a monitoring range. Furthermore, an example where the boom 4 is not considered in a monitoring range on the presumption that the derricking motion of the boom 4 is performed has been described in the embodiment, but the boom 4 may also be tilted to be close to a horizontal state during the attachment and detachment of the boom 4. A monitoring range considering the boom 4 may be set in such a case.

In addition, a monitoring range may be changed even in a case where electrical components, such as cameras, are attachable and detachable (assemblable and disassemblable).

It should be understood that the invention is not limited to the above-described embodiment, but may be modified into various forms on the basis of the spirit of the invention. Additionally, the modifications are included in the scope of the invention.

What is claimed is:

1. A crane that is assemblable and disassemblable and is capable of changing a monitoring range for periphery monitoring according to an assembly state of the crane, wherein the crane is capable of adding at least one space corresponding to a portion at which at least one attachable and detachable component is to be attached to the monitoring range when the attachable and detachable component is detached.

2. The crane according to claim 1, further comprising:

a detection sensor that detects the assembly state of the crane.

3. The crane according to claim 1, further comprising:

a controller that confirms with a driver whether or not the monitoring range is changeable, wherein the controller receives an input to change the monitoring range and changes the monitoring range.

4. The crane according to claim 1, wherein the monitoring range is changeable according to a change in a radius of a rear end of a rotating platform, which is the assembly state of the crane.

5. The crane according to claim 1, wherein the monitoring range is changeable according to a state of presence or absence of a counterweight, which is the assembly state of the crane.

6. The crane according to claim 1, wherein the monitoring range is changeable according to a state of presence or absence of a crawler, which is the assembly state of the crane, and in a case where the crawler is detached from the crane, a position at which the detached crawler is to be disposed is added to the monitoring range.

7. The crane according to claim 6, wherein, in a case where the crawler is detached from the crane, the monitoring range is changed according to a turning angle of a rotating platform.

8. The crane according to claim 1, wherein, in a case where work for suspending an object is performed, the monitoring range is reduced in size so that a portion on a front side of a rotating platform is reduced in size or is removed.

9. The crane according to claim 1, wherein the monitoring range is a range for determining whether an obstacle has entered the monitoring range.

10. The crane according to claim 9, wherein, in a case where an entry of the obstacle into the monitoring range is confirmed, the crane is configured to notify an operator of the entry of the obstacle.

11. The crane according to claim 9, further comprising:

a detection sensor that detects the assembly state of the crane; and a monitoring sensor that is capable of changing the monitoring range to detect the obstacle.

12. The crane according to claim 11, further comprising:

a controller that determines the range for changing the monitoring range according to a detection result of the detection sensor, wherein the controller confirms with a driver whether or not the monitoring range is changeable by displaying the monitoring range determined by the controller, and is configured to receive an input to change the monitoring range and change the monitoring range.

13. The crane according to claim 11, wherein the detection sensor is integrated with the monitoring sensor.

* * * * *